May 28, 1968   M. L. FINCH   3,385,126
ANTI-BACKLASH GEAR
Filed April 21, 1966
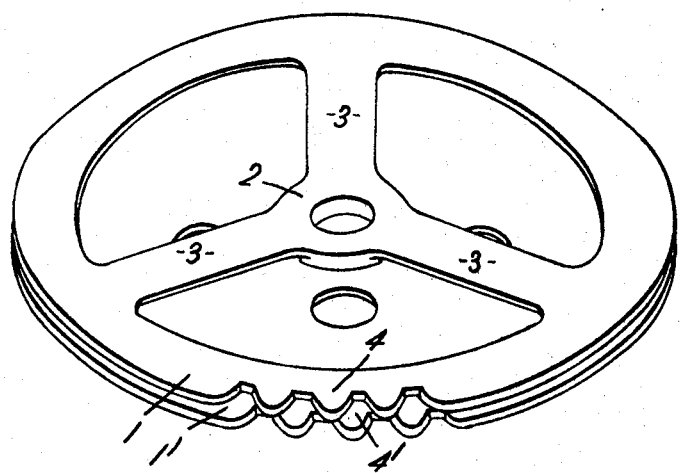

United States Patent Office 3,385,126
Patented May 28, 1968

3,385,126
ANTI-BACKLASH GEAR
Maurice L. Finch, London, England, assignor to International Standard Electric Corporation, New York, N.Y., a corporation of Delaware
Filed Apr. 21, 1966, Ser. No. 544,163
Claims priority, application Great Britain, May 21, 1965, 21,602/65
5 Claims. (Cl. 74—440)

ABSTRACT OF THE DISCLOSURE

A one-piece double or split-type anti-backlash gear of moulded plastic material. The floating half-gear is spring biassed by the resiliency of its integrally moulded spokes to that the teeth of each half-gear are effective on opposite tooth flanks on a driving pinion in meshing relationship. The invention provides a cheap but permanent, alternative to the conventional arrangements using a rigidly mounted gearwheel and a floating one of the same diameter spring-coupled to the fixed one.

---

The present invention relates to double or split-type anti-backlash gears. Such gears are unsuitable for transmitting large powers but find application in the driving arrangements of indicator mechanisms for instruments or in electronic equipment wherein lost-motion arising from backlash on reversal of the driving shaft is intolerable.

Conventional anti-backlash gears of the double or split-type (the type herein defined) employ two gearwheels of similar diameter and pitch, sometimes referred to as half-gears. One such half-gear is rigidly attached through a hub to a driven shaft; the other half-gear is free running on this shaft, i.e. "floats," but is spring-coupled onto the fixed half-gear. The teeth on the two half-gears are normally set out of line with one another so as to exert pressure on opposite tooth flanks of a driving pinion arranged to engage both half-gears.

According to the present invention there is provided an anti-backlash gear of the double or split-type as herein defined formed in one piece and including a hub common to two similar gearwheels, the rim of one of said gearwheels being resiliently attached by spokes to said hub and so that the respective sets of teeth are normally out-of-step with each other thereby to cause each set of teeth to exert pressure on opposite flanks of the teeth of a driving pinion engaging both gears.

Also according to the present invention there is provided an anti-backlash gear of the double or split-type as herein defined including two gearwheels, one of which is solid or substantially so, and the other of open construction employing spokes so as to be resilient, a hub common to both gearwheels and on which both said gearwheels are internally mounted so that the teeth of one of said gearwheels are normally out of line with those of the other said gearwheel, whereby on engagement mutually with a pinion slight relative movement takes place between the two gearwheels and the teeth on the respective gearwheels are caused to exert pressure on opposite flanks of the teeth on said driving pinion.

In a preferred embodiment of the invention, as shown in the sole figure of the accompanying drawing, two toothed rims 1, 1' are formed integral, as by moulding in plastics material, with a common hub 2. The attachment between one rim 1' and the hub is made substantially solid, so as to be non-deformable under load. The other rim 1 is attached to the hub by spokes 3, which are resilient. The two sets of teeth 4, 4' are moulded so as to be normally out of line with each other.

When a driving pinion is placed in meshing relationship with both sets of teeth on such a gearwheel, the resiliently mounted rim 1 yields slightly on its spokes 3, causing relative rotation between the two rims. The resultant torsional stress in one rim causes the two sets of teeth on the gearwheel to exert pressure on opposite flanks of the pinion teeth under all conditions, and backlash is effectively eliminated.

Such a gear arrangement is, in addition, exceedingly silent and smooth in its running.

Although the gear wheel components have been described as being respectively solid and resilient, they could, in fact, both be made of the spoked construction, particularly for use with very light loads.

The plastics material used should be of a kind that has slight resilience at normal temperatures, and is not brittle or readily fractured. Suitable materials are for example, nylon, polythene, styrene, and vinyl acetate.

It is to be understood that the following description of specific examples of this invention is made by way of example only and is not to be considered as a limitation on its scope.

What I claim is:
1. An anti-backlash gear of the double or split-type as herein defined formed in one molded piece and including a hub common to two similar gearwheels, the rim of one of said gearwheels being resiliently attached by spokes to said hub and so that the respective sets of teeth are normally out-of-step with each other thereby to cause each set of teeth to exert pressure on opposite flanks of the teeth of a driving pinion engaging both gears.

2. An anti-backlash gear as claimed in claim 1 and in which the other said gearwheel is made substantially solid with said hub.

3. An anti-backlash gear as claimed in claim 1 in which said gearwheels and said hub are moulded in one piece from plastics material.

4. An anti-backlash gear of the double or split-type as herein defined moulded in one piece from plastics material and including two gearwheels on a common hub, one of said gearwheels having resiliently deformable spokes whereby its teeth, normally out-of-step with those of the other gearwheel, are caused to exert pressure upon the opposite flanks of the teeth of a driving pinion engaging both gearwheels.

5. An anti-backlash gear of the double or split-type as herein defined including two gearwheels, one of which is solid or substantially so, and the other of which is of open construction having resilient spokes, a hub common to both gearwheels, and on which both said gearwheels are integrally mounted, so that the teeth of one of said gearwheels are normally out of line with those of the other said gearwheel, whereby on engagement mutually with a pinion slight relative movement takes place between the two gearwheels, and the teeth on the respective gearwheels are caused to exert pressure on opposite flanks of the teeth of said driving pinion.

References Cited

UNITED STATES PATENTS

| | | | |
|---|---|---|---|
| 2,845,809 | 8/1958 | Hetzel | 74—440 |
| 3,083,031 | 3/1963 | Elwell | 74—440 X |
| 3,122,938 | 3/1964 | Visser | 74—409 |

DONLEY J. STOCKING, Primary Examiner.

LEONARD H. GERIN, Examiner.